(12) United States Patent
Miao et al.

(10) Patent No.: US 11,736,533 B2
(45) Date of Patent: Aug. 22, 2023

(54) METHOD AND APPARATUS FOR IMPLEMENTING CALL SERVICE, ELECTRONIC DEVICE AND READABLE MEDIUM

(71) Applicant: ZTE CORPORATION, Guangdong (CN)

(72) Inventors: Yongsheng Miao, Guangdong (CN); Jingxiang Liu, Guangdong (CN); Lei Pan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/915,164

(22) PCT Filed: Mar. 31, 2021

(86) PCT No.: PCT/CN2021/084552
§ 371 (c)(1),
(2) Date: Sep. 28, 2022

(87) PCT Pub. No.: WO2021/197386
PCT Pub. Date: Oct. 7, 2021

(65) Prior Publication Data
US 2023/0117864 A1   Apr. 20, 2023

(30) Foreign Application Priority Data
Mar. 31, 2020 (CN) .......................... 202010246615.8

(51) Int. Cl.
*H04W 74/08* (2009.01)
*H04W 16/28* (2009.01)
*H04W 56/00* (2009.01)
*H04L 65/1016* (2022.01)
*H04L 65/1073* (2022.01)
*H04W 8/04* (2009.01)

(52) U.S. Cl.
CPC ...... *H04L 65/1016* (2013.01); *H04L 65/1073* (2013.01); *H04W 8/04* (2013.01)

(58) Field of Classification Search
CPC ............. H04L 65/1016; H04L 65/1073; H04L 41/0866; H04L 65/1046; H04L 65/1069; H04L 65/1104; H04L 41/0806; H04L 65/1101; H04W 8/04; H04W 12/08
See application file for complete search history.

(56) References Cited

U.S. PATENT DOCUMENTS

| | | | |
|---|---|---|---|
| 2011/0268098 A1* | 11/2011 | Keller | H04W 36/0022 370/338 |
| 2013/0194966 A1* | 8/2013 | Wang | H04L 65/1095 370/254 |
| 2018/0160290 A1* | 6/2018 | Bouvet | H04W 8/082 |

* cited by examiner

*Primary Examiner* — Eric Myers
(74) *Attorney, Agent, or Firm* — Li & Cai Intellectual Property (USA) Office

(57) ABSTRACT

Provided are a method and an apparatus for implementing a call service, an electronic device, and a computer readable storage medium, the method includes: deciding whether a first state of a terminal in an eMSC is consistent with a second state of the terminal in an IMS; if they are inconsistent, sending a registration request to the IMS to cause the terminal to complete an initial call service, wherein the eMSC does not subscribe to registration state information in the IMS.

13 Claims, 8 Drawing Sheets

METHOD AND APPARATUS FOR IMPLEMENTING CALL SERVICE, ELECTRONIC DEVICE AND READABLE MEDIUM

CROSS-REFERENCE TO RELATED APPLICATIONS

The present disclosure is a National Phase Application filed under 35 U.S.C. 371 as a national stage of PCT/CN2021/084522, filed on Mar. 31, 2021, an application claiming the priority to Chinese Patent Application No. CN202010246615.8 filed on Mar. 31, 2020, the entire contents of which are incorporated herein by reference.

TECHNICAL FIELD

Embodiments of the present disclosure relates to the field of communication technology, and in particular, to a method and an apparatus for implementing a call service, an electronic device, and a computer readable storage medium.

BACKGROUND

Internet Protocol (IP) Multimedia Subsystem (IMS) is an IP-based network architecture proposed by the $3^{rd}$ Generation Partnership Project (3GPP), which builds an open and flexible service environment, supports multimedia applications and provides users with rich multimedia services. IMS has no relation to access technology, and it can provide services for mobile cellular networks such as Global System for Mobile communications (GSM) and Universal Mobile Telecommunications System (UMTS), in addition to providing services for access networks such as General Packet Radio Service (GPRS), Wireless Local Area Network (WLAN), Packet Switched (PS), and Evolved Packet System (EPS). The mobile cellular networks such as GSM and UMTS employ circuit switching technology, which is referred to as Circuit Switched (CS) domain. When a terminal user in the CS domain accesses the IMS domain, the CS domain will be evolved as an access mode, and the services are provided uniformly by the IMS domain. This technology is referred to as IMS Centralized Service (ICS).

SUMMARY

An embodiment of the present disclosure provides a method for implementing a call service including: deciding whether a first state of a terminal in a Mobile Switch Center enhanced for ICS (eMSC) is consistent with a second state of the terminal in an IMS, and in response to an inconsistency between the first state and the second state, sending a registration request to the IMS to cause the terminal to complete an initial call service, wherein the eMSC does not subscribe to registration state information in the IMS.

An embodiment of the present disclosure further provides a method for implementing a call service including: receiving a registration request sent by an eMSC, wherein the registration request is a request sent when the eMSC decides that a first state of a terminal in it is inconsistent with a second state of the terminal in an IMS, and the eMSC does not subscribe to registration state information in the IMS, and the registration request includes an identification of the terminal; registering the terminal in the IMS according to the identification of the terminal; and in response to a call request of the terminal forwarded by the eMSC, providing service data for the terminal to complete an initial call service.

An embodiment of the present disclosure further provides an apparatus for implementing a call service including: a decision module configured to decide whether a first state of a terminal in an eMSC is consistent with a second state of the terminal in an IMS; and a sending module configured to, in response to deciding that the first state and the second state are inconsistent, send a registration request to the IMS to cause the terminal to complete an initial call service, wherein the eMSC does not subscribe to registration state information in the IMS.

An embodiment of the present disclosure further provides a Call Session Control Function entity (CSCF) including: a reception module configured to receive a registration request sent by an eMSC, wherein the registration request is a request sent when the eMSC decides that a first state of a terminal in it is inconsistent with a second state of the terminal in an IMS, and the eMSC does not subscribe to registration state information in the IMS, and the registration request includes an identification of the terminal; a registration module configured to register the terminal in the IMS according to the identification of the terminal; and a service module configured to, in response to a call request of the terminal forwarded by the eMSC, provide service data for the terminal to complete an initial call service.

An embodiment of the present disclosure further provides an electronic device including: one or more processors; and a storage device storing one or more programs thereon, wherein the one or more programs, when executed by the one or more processors, cause the one or more processors to implement the method for implementing a call service according to the embodiments of the present disclosure.

An embodiment of the present disclosure further provides a computer readable storage medium storing a computer program thereon, wherein the computer program, when executed by a processor, cause the processor to implement the method for implementing a call service according to the embodiments of the present disclosure.

BRIEF DESCRIPTION OF DRAWINGS

The accompanying drawings being a part of the specification are to provide a further understanding of the embodiments of the present disclosure, and to explain the present disclosure in conjunction with the embodiments of the present disclosure without constituting a limitation to the present disclosure. The above and other features and advantages will become more apparent to those skilled in the art by describing detailed exemplary embodiments with reference to the accompanying drawings, in which.

DETAIL DESCRIPTION OF EMBODIMENTS

Figure 1:
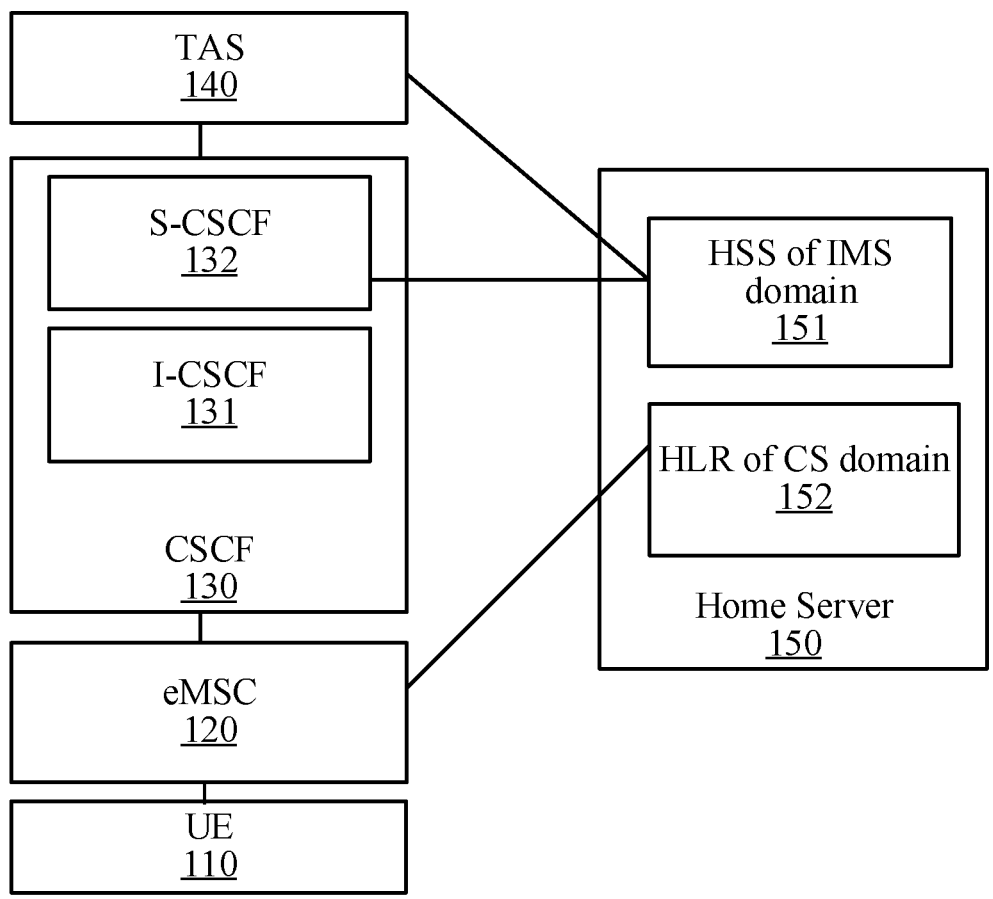
FIG. 1 is an ICS network architecture diagram of a user equipment accessing IMS through GSM and UMTS networks.

In order for those skilled in the art to better understand the technical solutions of the present disclosure, a method and an apparatus, an electronic device, and a computer readable storage medium provided by the present disclosure will be described in detail below in combination with the accompanying drawings.

Exemplary embodiments will be described more fully hereinafter with reference to the accompanying drawings although they may be embodied specifically in different forms and should not be construed as limited to the embodiments set forth herein. Rather, these embodiments are provided so that this disclosure will be thorough and complete, and will fully convey the scope of the disclosure to those skilled in the art.

The terms "first" and "second" in the description and claims of the present disclosure and the drawings are used to distinguish similar objects and are not necessarily used to describe a specific order or sequence. It should be understood that data so used may be interchanged under appropriate circumstances so that the embodiments described herein can be practiced in sequences other than those illustrated or described herein. Furthermore, the terms "comprising" or "having" and any variations thereof are intended to cover non-exclusive inclusion, for example, processes, methods, systems, products or devices comprising a series of steps or units are not necessarily limited to those expressly listed steps or units, but may include other steps or units not expressly listed or inherent to these processes, methods, products or devices.

Unless otherwise defined, all terms (including technical and scientific terms) used herein have the same meaning as commonly understood by one of ordinary skill in the art. It will also be understood that terms such as those defined in commonly used dictionaries should be construed as having meanings consistent with their meanings in the context of the related art and this disclosure, and will not be construed as having idealized or over-formal meanings, unless explicitly so limited herein.

When a terminal user performs ICS communication, it is necessary to rely on the subscription notification technology to ensure that the user states on the eMSC, CSCF in the IMS domain, and the Home Subscriber Server (HSS) in the IMS domain are consistent, so as to ensure that the normal operation of the calling and called services of the terminal user. If there is no registration state subscription between the eMSC and the CSCF, the Serving CSCF (S-CSCF) cannot let the eMSC know a current state of the terminal user through the notification message (NOTIFY) after the terminal user is deregistered from the IMS network, which may cause the terminal user to be shown as in a registration state on the eMSC, but be shown as in a deregistration state on the S-CSCF, resulting in inconsistent state of the terminal user. If the terminal user initiates a call request to the eMSC at this time, the eMSC considers that the terminal user is in the registration state since the eMSC saves the registration information of the terminal user and the name of the S-CSCF. Therefore, the eMSC forwards the call request of the terminal user to the S-CSCF. On the other hand, because the S-CSCF finds that the terminal user is in the deregistration state, it will directly reject the call request, thus causing the terminal user to be unable to complete a normal communication.

In the related art, it is required that the relevant information of the state subscription must be maintained between the eMSC and the S-CSCF, which makes the eMSC and the S-CSCF have to consume memory resources to save the relevant information of the state subscription, and it is also necessary to maintain the relevant messages such as initial subscription, refresh subscription, and notification message, which increases signaling traffic in the communication network and CPU consumption of network elements, and degrades the performance of the network elements.

The ICS network has the following advantages: 1) the IMS provides unified services for access modes of the circuit switched domain, the packet switched domain, etc., and supports network integration; 2) it supports the evolution of the CS network to the IMS network; 3) it not only supports a user terminal equipment with the ICS capability, but also supports existing user terminal equipment without the ICS capability. The user terminal equipment without ICS capability is also referred to as a traditional user equipment.

FIG. 1 is an ICS network architecture diagram in which a User Equipment (UE) accesses the IMS through the GSM and UMTS networks. The ICS network architecture shown in FIG. 1 mainly includes the following network elements: a UE 110, an eMSC 120, a CSCF 130, a Telecom Application Server (TAS) 140 and a Home Server 150.

The UE 110 is attached to the CS cellular network for a call service. For example, the UE 110 acts as the calling party to initiate a call request; or the UE 110 acts as the called party to receive a call request sent by a calling terminal. The UE 110 may or may not support the ICS capability.

The eMSC 120 supporting the ICS is used to cause the UE 110 to access from the $2^{nd}$ Generation Mobile Networks (2G) or the $3^{rd}$ Generation Mobile Networks (3G), while initiating registration with the IMS network on behalf of a traditional terminal. When the UE 110 initiates a call, the eMSC 120 is responsible for forwarding the call request of the terminal to the IMS domain, and the relevant equipment in the IMS domain performs user services. The interface between the UE 110 and the eMSC 120 is an A/Iu interface.

The CSCF 130 is responsible for registration authentication, call routing and service triggering in the IMS domain. The CSCF 130 includes an Interrogating CSCF (I-CSCF) 131 and an S-CSCF 132. Between the eMSC 120 and the CSCF 130 is an 12 interface based on a Session Initiation Protocol (SIP) protocol.

The TAS 140 is responsible for performing user subscription services. Between the S-CSCF 132 and the TAS 140 is a standard ISC interface based on the SIP protocol; between the IMS-HSS 151 and the TAS 140 is an Sh interface based on the protocol suite (Diameter) protocol, wherein the Diameter protocol is not a single protocol, but a protocol suite, which includes a base protocol (Diameter Base Protocol) and various application protocols extended from the base protocol.

The Home Server 150 is used to store information of the UE, and may include an HSS (IMS-HSS) 151 of the IMS domain and a Home Location Register (HLR) 152 of the CS domain. The IMS-HSS 151 serves users in the IMS domain, and the HLR 152 serves users in the CS domain. Between the IMS-HSS 151 and the S-CSCF 132 is a Cx interface based on the Diameter protocol, and between the HLR 152 and the eMSC 120 is a C interface based on the Mobile Application Part (MAP) protocol.

Figure 2:
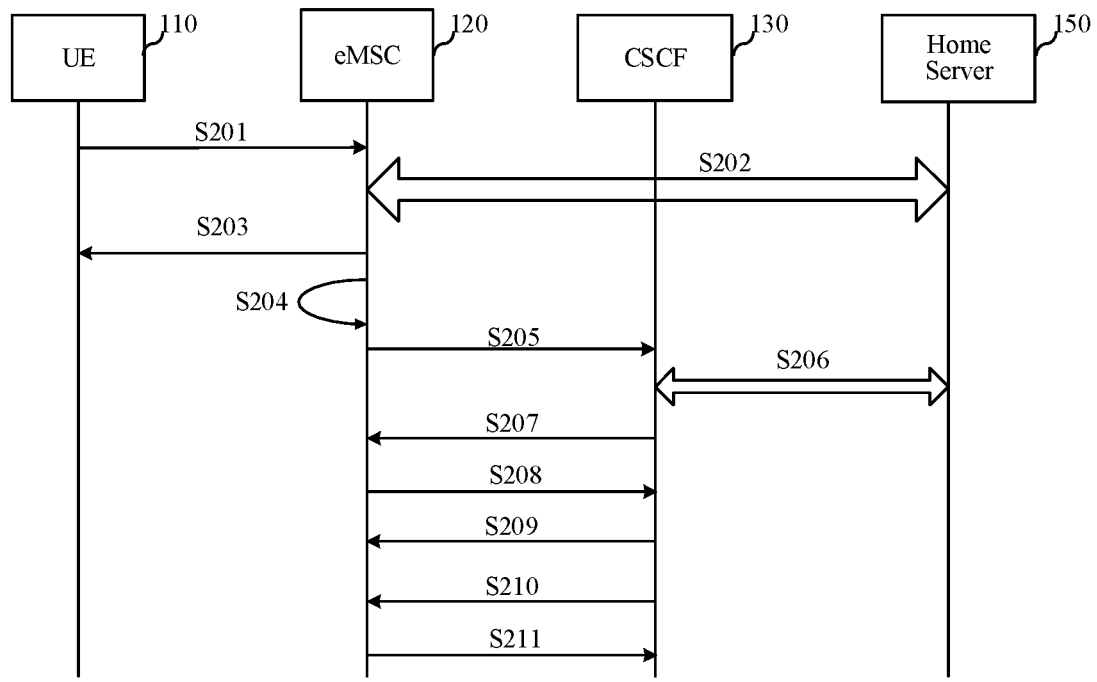
FIG. 2 is a flowchart of registration and subscription signallings of an ICS user.

FIG. 2 is a flowchart of registration and subscription signallings of an ICS user, which includes the following Operations S201 to S211.

In Operation S201, the UE 110 initiates a location update (Location-Update) request to the eMSC 120.

In Operation S202, the eMSC 120 completes the download of service data required by the terminal through signaling interaction with the Home Server 150, and causes the Home Server 150 to update the address of the eMSC 120 saved on the Home Server 150.

In Operation S203, the eMSC 120 returns a Location-Update response to the UE 110, and the Location-Update response includes an attachment indicator, which indicates that the UE 110 has successfully attached to a CS domain.

In Operation S204, the eMSC 120 prepares to initiate IMS registration with an IMS domain on behalf of the UE 110 according to the subscribed ICS user attribute returned by the HLR 152 in the home server 150, or according to the ICS user attribute configured based on the number segment of the International Mobile Subscriber Identity (IMSI) of the subscribed ICS user terminal.

In Operation S205, the eMSC 120 sends a registration request to the CSCF 130, and the registration request is used to cause the UE 110 to be registered in the IMS domain.

In Operation S206, after receiving the registration request sent by the eMSC 120, the CSCF 130 performs signaling interaction with the IMS-HSS 151 in the Home Server 150, and downloads the subscription data to the CSCF 130.

In Operation S207, the CSCF 130 returns a registration success response message to the eMSC 120.

In Operation S208, after receiving the registration success response, the eMSC 120 actively initiates a subscription request of the registration state to the CSCF 130.

In Operation S209, after receiving the subscription request of the registration state sent by the eMSC 120, the S-CSCF 132 in the CSCF 130 processes the subscription request and returns a subscription success response to the eMSC 120.

In Operation S210, the S-CSCF 132 in the CSCF 130 sends a notification message (NOTIFY) to the eMSC 120 based on the subscription session, the notification message is used to inform the eMSC 120 of the registration state of the subscribed UE 110 in the IMS.

In Operation S211, after acquiring the registration state of the UE 110 in the IMS, the eMSC 120 returns a success response to the S-CSCF 132 in the CSCF 130, so that the S-CSCF 132 determines that the eMSC 120 has known the registration state of the UE 110 in the IMS.

It should be noted that, after the ICS user (e.g., the UE 110) is successfully registered in the IMS domain and successfully subscribes to the registration state information, if the state of the ICS user in the IMS network changes, the IMS network can actively trigger network deregistration so as to enable the eMSC 120 to know the state of the ICS user in the IMS domain. The network deregistration includes network deregistration in the CSCF 130 and network deregistration in the IMS. In the related art, the S-CSCF 132 may send a notification message to notify the eMSC 120 through the existing subscription session (for example, the above Operation S210) so that the eMSC 120 can synchronously deregister the ICS user, thereby ensuring that the registration states of the ICS users on the S-CSCF 132, the IMS-HSS 151 and the eMSC 120 can be kept consistent.

Figure 3:
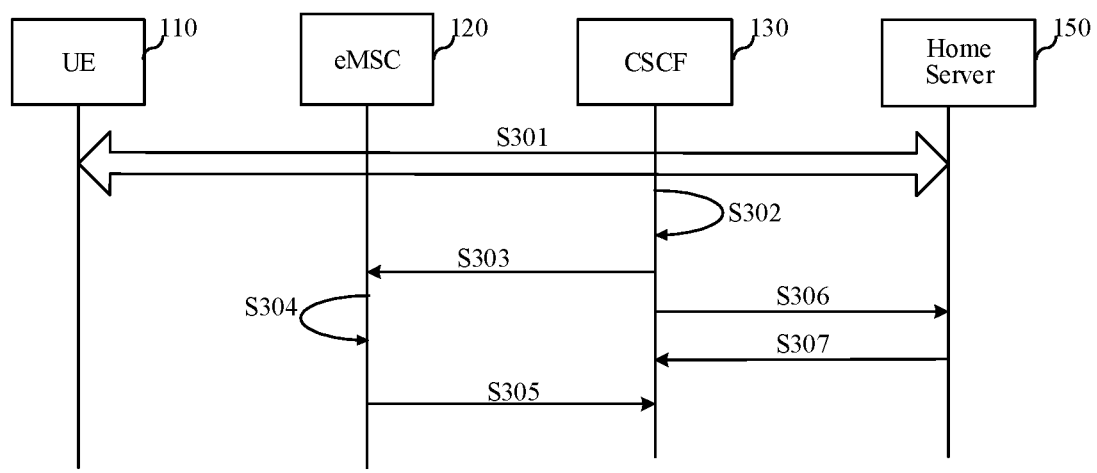
FIG. 3 is a flowchart of signallings that a serving CSCF in the IMS network initiates deregistration of the ICS user actively.

FIG. 3 is a flowchart of signallings that the S-CSCF 132 in the IMS network initiates deregistration of the ICS user actively, which may include the following Operations S301 to S307.

In Operation S301, the UE 110 successfully completes the registration on both the CS domain and the IMS domain, and the state of the UE 110 on the CS domain and the state of the UE 110 on the IMS domain are both registration state.

In Operation S302, the CSCF 130 triggers the deregistration of the UE 110, for example, due to the operator management requirement.

For example, the operator removes the UE 110 before upgrading, or requires the re-registration of the UE 110, etc.

In Operation S303, based on the state message subscribed by the eMSC 120, the CSCF 130 sends a notification message (NOTIFY) to the eMSC 120 after deregistering the UE 110 from the IMS, and the notification message includes that the UE 110 is in a deregistration state in the IMS.

In Operation S304, after obtaining the notification message that the UE 110 is in the deregistration state in the IMS, the eMSC 120 deregisters the UE 110 from the CS domain and changes the state of the UE 110 in the CS domain to the deregistration state.

In Operation S305, the eMSC 120 sends a success response to the CSCF 130, so that the CSCF 130 knows that the state of the UE 110 in the CS domain is the deregistration state.

In Operation S306, the CSCF 130 sends a service assignment request (Server-Assignment-Request) to the Home Server 150, notifying the IMS-HSS 151 in the Home Server 150 to deregister the UE 110.

In Operation S307, after deregistering the UE 110, the IMS-HSS 151 in the Home Server 150 feeds back a service assignment answer message (Server-Assignment-Answer) to the CSCF 130, so that the CSCF 130 knows that the UE 110 has been successfully deregistered.

So far, after the S-CSCF 132 initiates the deregistration of the UE 110 in the IMS, the state of the UE 110 on the eMSC 120, the state of the UE 110 on the CSCF 130, and the state of the UE 110 on the Home Server 150 are all the deregistration state, that is, the state of the UE 110 in the CS domain is made consistent with the state of the UE 110 in the IMS.

Figure 4:
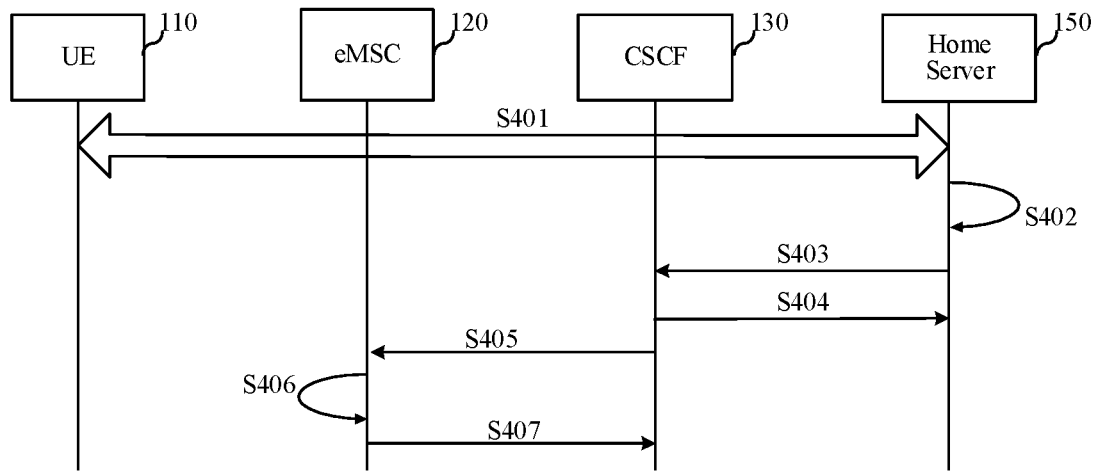
FIG. 4 is a flowchart of signallings that a home subscriber server of the IMS domain in the IMS network initiates deregistration of the ICS user actively.

FIG. 4 is a flowchart of signallings that the IMS-HSS 151 in the IMS network initiates deregistration of the ICS user actively, which may include the following Operations S401 to S407.

In Operation S401, the UE 110 successfully completes the registration on both the CS domain and the IMS domain, and the state of the UE 110 on the CS domain and the state of the UE 110 on the IMS domain are both the registration state.

In Operation S402, the IMS-HSS 151 in the Home Server 150 triggers the deregistration of the UE 110, for example, due to the operator management requirement.

For example, the operator removes the UE 110 before upgrading, or deregisters the UE 110 as needed.

In Operation S403, the IMS-HSS 151 constructs and sends a registration termination request (Registration-Termination-Request, RTR), notifying the CSCF 130 to deregister the UE 110.

In Operation S404, after receiving the RTR, the CSCF 130 deregisters the UE 110 and returns a registration termination response (Registration-Termination-Answer, RTA) to the IMS-HSS 151 at the same time.

In Operation S405, the CSCF 130 sends a notification message (NOTIFY) to the eMSC 120 based on the state message subscribed by the eMSC 120, and the notification message includes that the UE 110 is in the deregistration state in the IMS.

In Operation S406, the eMSC 120 deregisters the UE 110 according to the received notification message that the UE 110 is in the deregistration state in the IMS, and updates the state of the UE 110 in the CS domain to the deregistration state.

In Operation S407, the eMSC 120 sends a success response (for example, a response message containing 200OK) to the CSCF 130.

So far, after the IMS-HSS 151 initiates the deregistration of the UE 110 in the IMS, the state of the UE 110 on the eMSC 120, the state of the UE 110 on the CSCF 130, and the state of the UE 110 on the IMS-HSS 151 are all the deregistration state, namely, the state of the UE 110 in the CS domain is made consistent with the state of the UE 110 in the IMS.

In the above deregistration operations for a UE, it is necessary to rely on the subscription notification technology to ensure that the states of the UE on the eMSC and on the CSCF and the IMS-HSS in the IMS domain remain consistent, thereby ensuring that the calling/called services initiated by the UE are performed normally. If there is no subscription registration state information between the eMSC and the CSCF, the CSCF cannot notify the eMSC through a notification message upon a network deregistration, resulting that the state of the UE on the eMSC is the registration state while the state of the UE on the CSCF is the deregistration state. In this case, if the UE initiates a call, the eMSC will send the call request of the UE to the S-CSCF, since the eMSC locally saves the registration information of the UE and the name of the S-CSCF in the CSCF and considers that the user is in the registration state; however, since the UE has been deregistered from the S-CSCF, the S-CSCF directly rejects the call request of the UE, and thereby resulting in failure of the initial call service of the UE. Because the subscription session between the eMSC and the S-CSCF must be maintained, on the one hand, the memory resources of the eMSC and the S-CSCF need to be consumed to save the relevant information of the subscription session, and on the other hand, the interactive messages (e.g., initial subscription, refresh subscription, notification message) in the subscription session increases the network signaling traffic and the CPU consumption of the network elements, and degrades the performance of the network elements.

The present disclosure provide a method and an apparatus for implementing a call service, an electronic device, and a computer readable storage medium in order to solve the problem that the terminal user cannot normally access the IMS due to the lack of subscription registration state information when the terminal user performs ICS communication.

The present disclosure provides a method for implementing a call service to solve the above problems, so as to reduce the consumption of the cache resources of the eMSC, reduce the network signaling traffic, and at the same time ensure that the call service of the UE can be completed normally and quickly.

The implementation details of the method for implementing a call service according to the present disclosure will be specifically described below. The following content is only for the convenience of understanding the implementation details of the solution, and is not necessary for implementing the solution.

Figure 5:
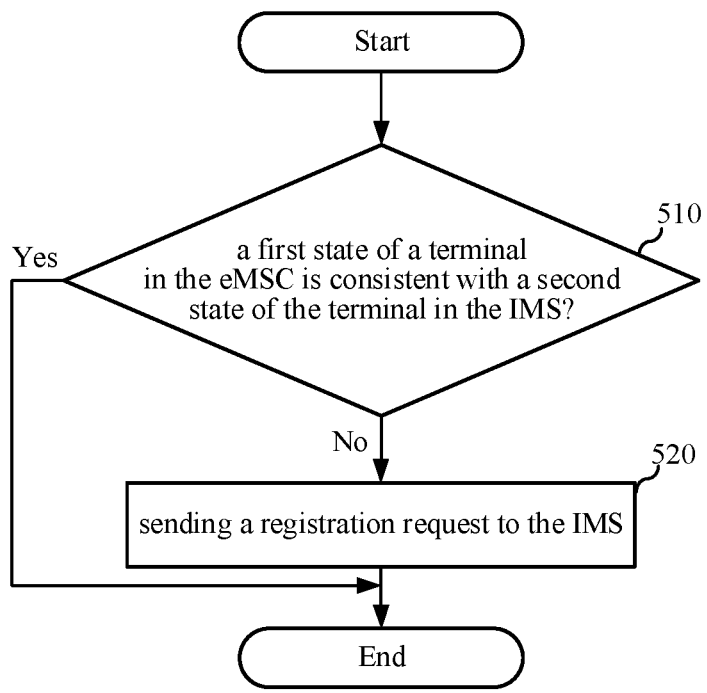
FIG. 5 is a flowchart of a method for implementing a call service according to the present disclosure.

FIG. 5 is a flowchart of a method for implementing a call service according to the present disclosure. The method is applicable to an apparatus for implementing a call service, and the apparatus is operable on the eMSC. As shown in FIG. 5, the method may include the following Operations S510 to S520.

In Operation S510, it is decided whether a first state of a terminal in the eMSC is consistent with a second state of the terminal in the IMS.

It should be noted that the eMSC does not subscribe to the registration state information in the IMS. The first state may be the registration state or the deregistration state, and the second state may also be the registration state or the deregistration state. When the first state and the second state are inconsistent, Operation 520 is executed; otherwise, the process ends.

In Operation S520, a registration request is sent to the IMS.

After a device in the IMS receives the registration request of the terminal, the terminal is allowed to successfully access the device in the IMS if the second state of the terminal in the IMS is determined to be the registration state by query, thereby causing the terminal to complete the initial call service.

In some specific implementations, if the first state is the registration state and the second state is the deregistration state, a registration request is sent to the IMS to cause the terminal to complete the initial call service.

It should be noted that, since the first state is inconsistent with the second state and the first state is the registration state, the apparatus for implementing a call service will consider the terminal to be a user that has successfully registered in the CS domain but has not been registered in the IMS domain and thus the registration request needs to be sent to the IMS to cause the device in the IMS to complete the registration of the terminal. After the second state of the terminal in the IMS is updated to the registration state, the apparatus for implementing a call service then sends the call request of the terminal to the device in the IMS, causing the terminal to successfully complete the initial call service and obtain relevant service data in the IMS, thereby ensuring that the initial call service of the terminal can be completed quickly and smoothly without subscribing to the registration state information in the IMS, and improving the efficiency of service processing.

In some specific implementations, after the terminal completes the initial call service step, the method for implementing a call service according to the present disclosure further includes: deregistering the terminal in response to a deregistration message sent by an HLR in the IMS; and changing the first state to the deregistration state.

It should be noted that, if the HLR in the IMS initiates the deregistration of the terminal, the signaling interaction between the Home Server and the S-CSCF in the IMS enables all the devices in the IMS to know that the second state of the terminal is the deregistration state. Since the registration state information is not subscribed to in the IMS, the HLR actively sends a deregistration message to the apparatus for implementing a call service, informing the apparatus for implementing a call service to deregister the terminal, and to change the first state of the terminal to the deregistration state, so that the first state of the terminal in the CS domain and the second state of the terminal in the IMS are both the deregistration state, which performs the state synchronization in advance for the terminal to perform a subsequent call service, ensures that the subsequent service process of the terminal can be successfully completed, improves the service processing efficiency, and improves the user experience.

In the present disclosure, it is decided whether the first state of the terminal in the eMSC is consistent with the second state of the terminal in the IMS, and if the first state is inconsistent with the second state, a registration request is sent to the IMS to enable the terminal to communicate with the devices in the IMS, thereby enabling the terminal to complete the initial call service and obtain the relevant service information in the IMS. Meanwhile, the devices in the eMSC and IMS do not need to consume memory resources to save the registration state information and relevant signaling information, reducing the CPU consumption of the devices in the eMSC and the IMS, reducing the network signaling traffic, and improving the performance of the network elements.

Figure 6:
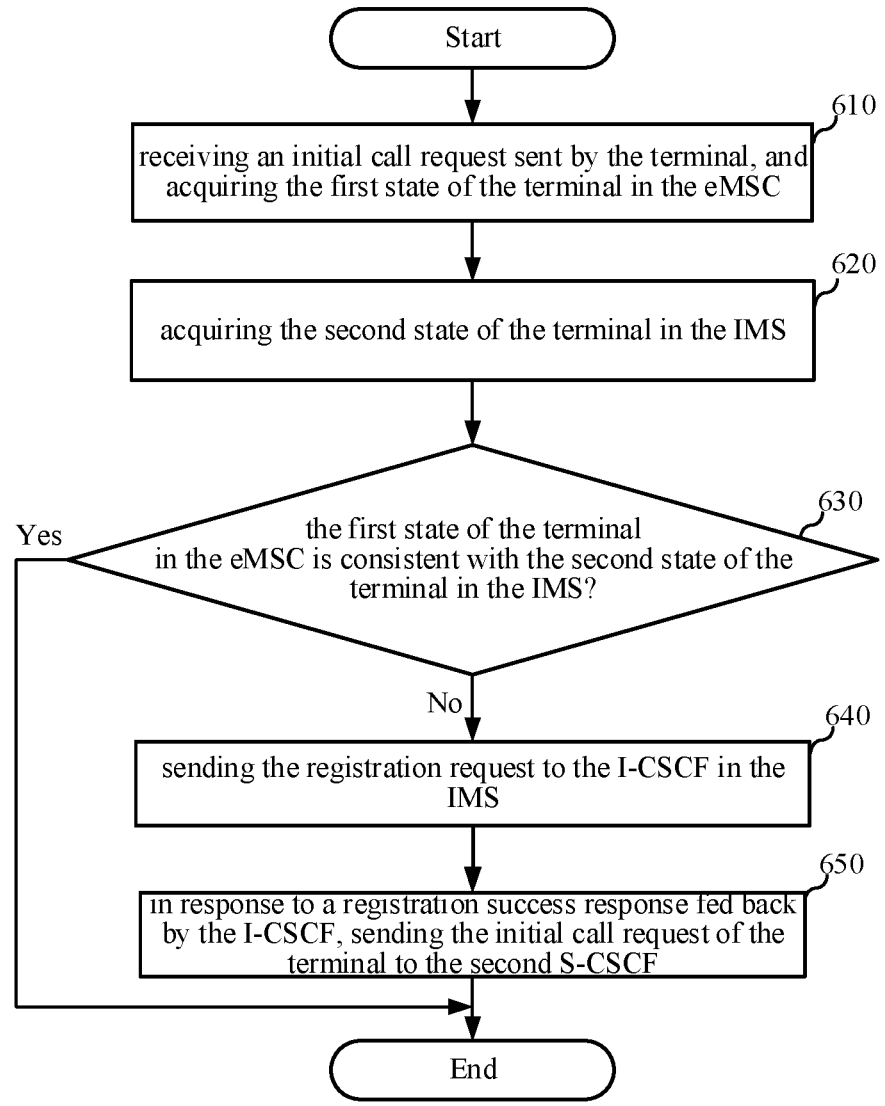
FIG. 6 is a flowchart of a method for implementing a call service according to the present disclosure.

FIG. 6 is a flowchart of a method for implementing a call service according to the present disclosure. The method is applicable to an apparatus for implementing a call service, and the apparatus is operable on the eMSC. The embodiment described with reference to FIG. 6 is roughly the same as the embodiment described with reference to FIG. 5, and the main difference is that: if it is decided that the first state and the second state of the terminal are inconsistent, a registration request needs to be sent to the I-CSCF in the IMS to enable the I-CSCF to reselect an S-CSCF, i.e., the second S-CSCF, for the terminal, so as to complete the relevant services of the terminal in the IMS domain.

As shown in FIG. 6, the method for implementing a call service may include the following Operations S610 to S650.

In Operation S610, an initial call request sent by the terminal is received, and the first state of the terminal in the eMSC is acquired.

The initial call request includes the identification of the terminal, and the apparatus for implementing a call service searches the local database or cache according to the identification of the terminal to know whether the terminal has been successfully registered to the apparatus for implementing a call service, that is, whether the first state of the terminal in the eMSC is a registration state or a deregistration state.

In some specific implementations, after Operation 610, the method further includes: in response to the first state being the deregistration state, sending a registration request to the IMS.

When it is determined that the first state is the deregistration state, it means that the terminal is not registered to the apparatus for implementing a call service, it is necessary to complete the registration process of the terminal in the eMSC, and update the first state of the terminal in the eMSC to the registration state. Since the second state of the terminal in the IMS domain may also be the deregistration state, the registration request needs to be sent to the IMS to ensure that the terminal can complete the registration in the IMS domain so that the second state of the terminal in the IMS domain is also the registration state, so as to achieve the purpose of synchronizing the first state and the second state.

In Operation S620, the second state of the terminal in the IMS is acquired.

The second state of the terminal in the IMS can be acquired by sending a query request to a device in the IMS and by using a query result fed back by the device in the IMS. The second state may be the registration state or the deregistration state.

In some specific implementations, the initial call request is forwarded to a first S-CSCF in the IMS; in response to a call rejection response fed back by the first S-CSCF, the second state of the terminal is acquired, which is the deregistration state.

It should be noted that, since the first state of the terminal in the eMSC is the registration state, the apparatus for implementing a call service may decide that the terminal has been successfully registered in the IMS, and thus may send an initial call request to the first S-CSCF in the IMS; however, since the first S-CSCF determines that the terminal is not registered in the IMS by querying the identification of the terminal, that is, the second state of the terminal is the deregistration state, the first S-CSCF may reject the call request of the terminal and feed back a call rejection response to the apparatus for implementing a call service to cause the apparatus for implementing a call service to know that the terminal is not registered in the IMS.

In some specific implementations, after Operation S610 and before forwarding the initial call request to the first S-CSCF in the IMS, the method further includes: caching the initial call request to the eMSC.

It should be noted that, if the first S-CSCF in the IMS feeds back a call rejection response (i.e., the terminal is rejected to complete the call service in the IMS domain) because the terminal is not registered in the IMS, the apparatus for implementing a call service or the eMSC including the apparatus for implementing a call service may cache the call request sent by the terminal instead of immediately returning a call success response or a call failure response to the terminal, and it feeds back a call success response or a call failure response to the terminal only when the eMSC assists the terminal to complete the registration on the IMS domain and determines whether the terminal can complete the call service in the IMS domain.

If it is determined that the first S-CSCF in the IMS feeds back the call rejection response to the eMSC not because the terminal is not registered in the IMS, but possibly due to reasons such as the failure of a relevant device in the IMS, the eMSC can directly return the call rejection response to the terminal to reject the current initial call service of the terminal.

In Operation S630, it is decided whether the first state of the terminal in the eMSC is consistent with the second state of the terminal in the IMS.

It should be noted that the eMSC does not subscribe to the registration state information in the IMS. When the first state and the second state are inconsistent, Operation 640 is executed; otherwise, the process ends. The content of Operation S630 in this embodiment is the same as that of Operation S510 in the embodiment described with reference to FIG. 5, and details are not repeated here.

In Operation S640, a registration request is sent to the I-CSCF in the IMS.

The registration request includes the identification of the terminal. The I-CSCF is used to interrogate the HSS according to the identification of the terminal, select a second S-CSCF for the terminal and forward the registration request to the second S-CSCF.

It should be noted that the I-CSCF is the entry point of the IMS network, and its main function is to designate a certain S-CSCF for the UE to perform the registration service of the terminal, for example, to interrogate the HSS according to the identification of the terminal to obtain the address of the second S-CSCF, and then select the second S-CSCF for the terminal to perform the registration service of the terminal.

The I-CSCF uses the address of the second S-CSCF as the destination address, and forwards the registration request of the terminal to the second S-CSCF to enable the terminal to be successfully registered to the second S-CSCF.

In Operation S650, in response to a registration success response fed back by the I-CSCF, the initial call request of the terminal is sent to the second S-CSCF.

The registration success response fed back includes the address of the second S-CSCF so that the eMSC can know the address of the second S-CSCF. Then, the eMSC uses the address of the second S-CSCF as the destination address and sends the initial call request of the terminal to the second S-CSCF to enable the terminal to complete its initial call service through the second S-CSCF.

It should be noted that, the terminal was originally registered to the first S-CSCF; however, the first S-CSCF in the IMS domain was restarted or was in a disaster tolerance scenario due to reasons such as a device failure, so that the first S-CSCF deregistered the terminal and the registration state information is not subscribed to, resulting in inconsistent between the first state and the second state of the terminal. In this case, when the terminal initiates the call request, the terminal needs to be re-registered in the IMS domain, that is, the eMSC re-registers the terminal to the second S-CSCF, so that the second S-CSCF provides the terminal with the service data of the corresponding IMS domain.

In the present disclosure, when it is decided that the first state and the second state of the terminal are inconsistent, the registration request is sent to the I-CSCF in the IMS, so that the I-CSCF can reselect the S-CSCF (i.e., the second S-CSCF) for the terminal to ensure that the terminal can be re-registered in the IMS, thereby enabling the terminal to successfully complete its call service in the IMS domain. Even if the registration state information is not subscribed to, the registration and call services in the IMS domain can still be quickly completed, reducing the registration state subscription information maintained between network element devices, simplifying the signaling process, improving the service processing efficiency, and improving the user experience.

Figure 7:
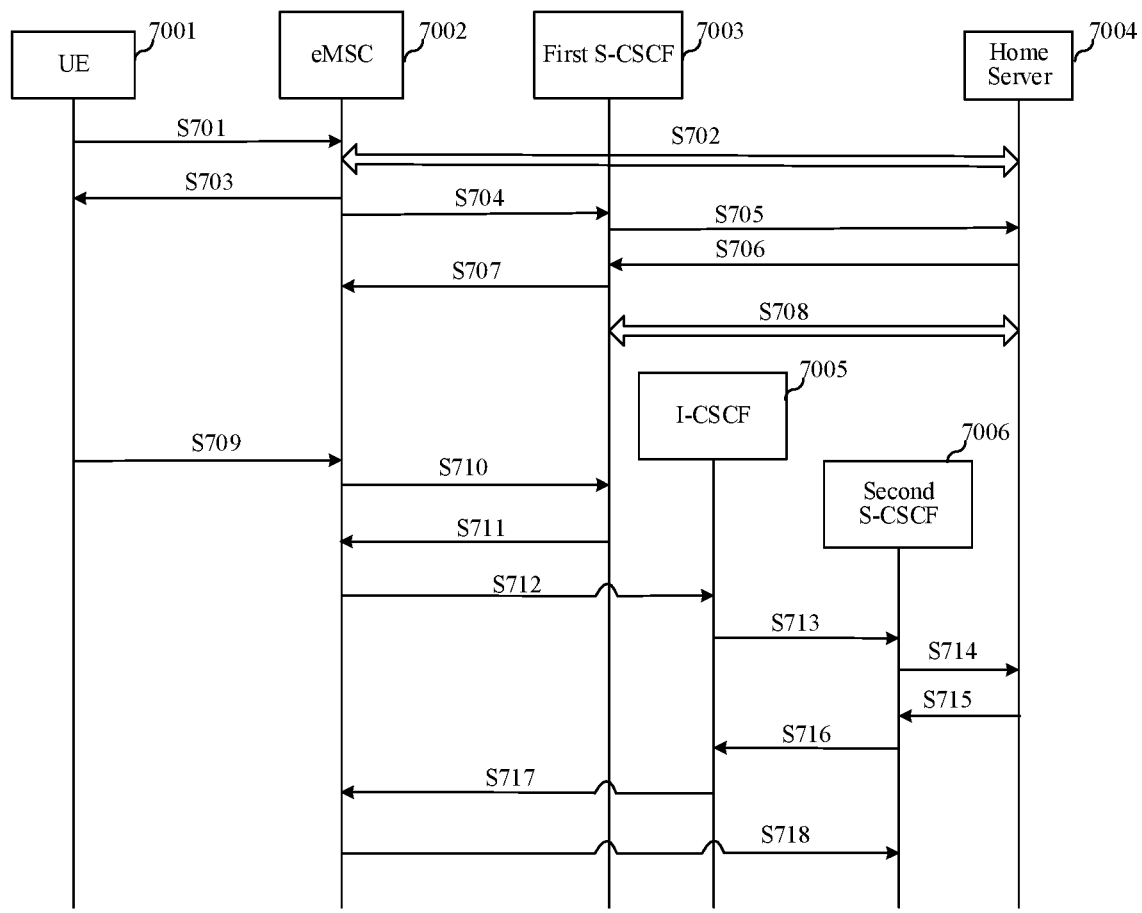
FIG. 7 is a flowchart of a working method of an eMSC when performing an initial call service of a terminal according to the present disclosure.

FIG. 7 is a flowchart of a working method of an eMSC when performing an initial call service of a terminal according to the present disclosure. Without relying on the registration state subscription notification mechanism, it solves the problem of inconsistency between the first state of the ICS user on the eMSC and the second state of the ICS user on the IMS domain, and ensures that the initial call service process of the terminal can be performed normally. The method may include the following Operations S701 to S718.

In Operation S701, the UE 7001 sends a local update request to the eMSC 7002.

In Operation S702, by performing signaling interaction with a device in the IMS (e.g., the Home Server 7004 in the IMS), the eMSC 7002 completes the update of local information (e.g., causing the Home Server 7004 to update the address of the eMSC 7002 saved thereon, etc.).

In Operation S703, the eMSC 7002 feeds back a local update success response to the UE 7001.

In Operation S704, the eMSC 7002 sends a registration request to the first S-CSCF 7003, and the registration request is used to make the UE 7001 to be registered to the first S-CSCF 7003 in the IMS.

In Operation S705, after receiving the registration request sent by the eMSC 7002, the first S-CSCF 7003 sends a subscription data request (for example, sending a message Diameter_SAR based on the Diameter protocol) to the Home Server 7004 in the IMS.

In Operation S706, after confirming that the subscription of the UE 7001 is successful, the Home Server 7004 feeds back a subscription data success response (e.g., feeds back a message Diameter_SAA based on the Diameter protocol) to the first S-CSCF 7003.

In Operation S707, the first S-CSCF 7003 returns a registration success response message to the eMSC 7002, to cause the eMSC 7002 to confirm that the UE 7001 has been successfully registered to the first S-CSCF 7003 in the IMS.

It should be noted that, since the eMSC 7002 does not initiate a registration state subscription, the first state of the UE 7001 on the eMSC 7002 (i.e., the registration state of the UE 7001 on the CS domain) may be different from the second state on the device in the IMS (i.e., the registration state of the UE 7001 on the IMS domain).

In Operation S708, the IMS domain initiates the deregistration of the UE 7001. Through signaling interaction between the first S-CSCF 7003 and the Home Server 7004, all the devices in the IMS can know that the second state of the UE 7001 is the deregistration state. However, since the eMSC 7002 does not initiate a registration state subscription, the first S-CSCF 7003 cannot send the notification message (NOTIFY) to the eMSC 7002, so that the first state of the UE 7001 on the eMSC 7002 is still the registration state.

In Operation S709, in the CS domain, the UE 7001 sends a call request to the eMSC 7002.

In Operation S710, the eMSC 7002 knows that the first state of the UE 7001 is the registration state by query, and then forwards the call request of the UE 7001 to the first S-CSCF 7003.

In Operation S711, after receiving the call request (e.g., SIP_INVITE based on the SIP protocol) from the UE 7001, the first S-CSCF 7003 knows by query that the UE 7001 has been deregistered, and thus may reject the call service of the UE 7001, and feed back a call failure response message (e.g., a call failure response message based on the SIP protocol) to the eMSC 7002.

It should be noted that the call failure response message carries a user unregistration indication indicating that the second state of the UE 7001 in the IMS is the deregistration state. The SIP protocol can be used for transmission between the first S-CSCF 7003 and the eMSC 7002, and other communication protocols may also be used, which can be specifically set according to the actual situation. Other communication protocols not exemplified are also within the protection scope of the present disclosure, which will not be repeated here.

In Operation S712, the eMSC 7002 obtains the user unregistration indication by parsing the received call failure response message, knowing that the second state of the UE 7001 in the IMS is the deregistration state, and thus caching the call request message of the UE 7001 in the eMSC, and at the same time sending a new registration request to the I-CSCF 7005 in the IMS.

In Operation S713, the I-CSCF 7005 allocates the UE 7001 to the second S-CSCF 7006 by interrogating, and then forwards the new registration request to the second S-CSCF 7006.

In Operation S714, after receiving the new registration request sent by the I-CSCF 7005, the second S-CSCF 7006 sends a re-subscription data request (e.g., sends a message Diameter_SAR based on the Diameter protocol) to the Home Server 7004 in the IMS.

In Operation S715, after confirming that the re-subscription of the UE 7001 is successful, the Home Server 7004 feeds back a re-subscription data success response (e.g., feeds back a message Diameter_SAA based on the Diameter protocol) to the second S-CSCF 7006.

In Operation S716, the second S-CSCF 7006 returns a new registration success response message to the I-CSCF 7005.

The registration success response message includes the address of the second S-CSCF 7006.

In Operation S717, the I-CSCF 7005 confirms that the UE 7001 has been successfully registered to the second S-CSCF 7006 in the IMS, and feeds back a registration success response to the eMSC 7002.

It should be noted that, after it is confirmed that the UE 7001 has been registered to the second S-CSCF 7006 in the IMS, the first state of the UE 7001 in the eMSC 7002 and the second state of the UE 7001 in the IMS are both the registration state, ensuring that the state of the UE 7001 in the CS domain is the same as the state of the UE 7001 in the IMS domain.

In Operation S718, according to the address of the second S-CSCF 7006 in the registration success response message, the eMSC 7002 sends the cached call request of the UE 7001 to the second S-CSCF 7006 to which the UE 7001 is newly registered, so as to complete the current call service and ensure that the call service process is performed normally.

In the present disclosure, by forwarding the call request of the UE to the first S-CSCF in the IMS, the call failure response message fed back by the first S-CSCF can be obtained, thereby knowing the inconsistent between the first state of the UE on the eMSC and the second state of the UE on the IMS. Then, a re-initiation registration request is sent to the IMS domain to cause the UE to be re-registered to the second S-CSCF in the IMS, ensuring that the first state of the UE in the CS domain and the second state of the UE in the IMS domain can be consistent, that is, both are in the registration state, thereby completing the initial call service and obtaining the relevant service information in the IMS. In this way, the devices in the eMSC and the IMS do not need to consume memory resources to save the registration state information and relevant signaling information, reducing the CPU consumption of the devices in the eMSC and the IMS, reducing the network signaling traffic, and improving the performance of the network elements.

The present disclosure provides a method for implementing a call service. The implementation details of the method for implementing a call service according to the present disclosure will be specifically described below. The following content is only for the convenience of understanding the implementation details of the solution, and is not necessary for implementing the solution.

Figure 8:
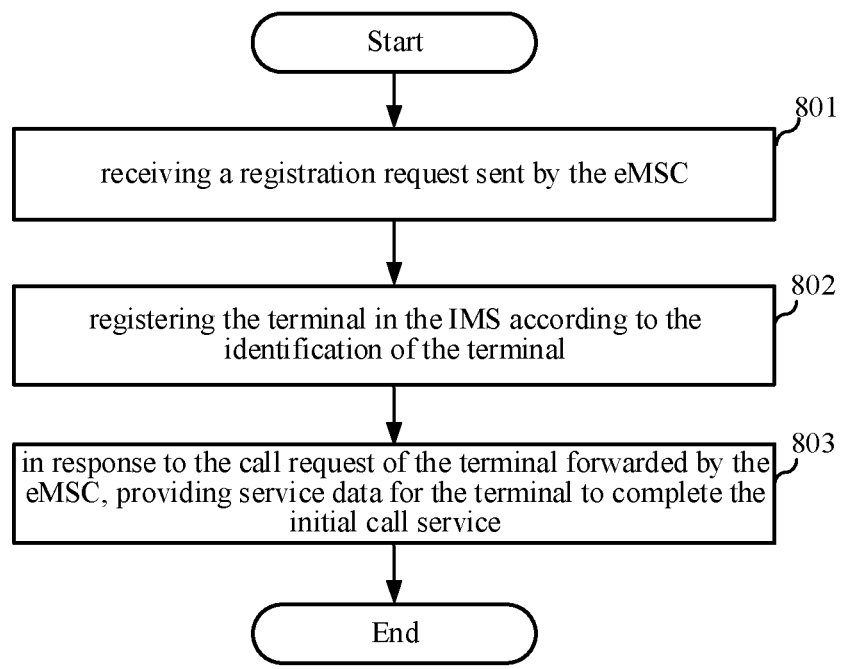
FIG. 8 is a flowchart of a method for implementing a call service according to the present disclosure.

FIG. 8 is a flowchart of a method for implementing a call service according to the present disclosure. The method is applicable to a CSCF. As shown in FIG. 8, the method includes the following Operations S801 to S803.

In Operation S801, a registration request sent by the eMSC is received.

The registration request is a request sent by the eMSC when it decides that the first state of the terminal on the eMSC is inconsistent with the second state of the terminal on the IMS, and the eMSC does not subscribe to the registration state information in the IMS, the registration request includes an identification of the terminal.

It should be noted that the CSCF may include an I-CSCF, a first S-CSCF, and a second S-CSCF. The terminal is initially registered to the first S-CSCF. Due to reasons such as network adjustment or device maintenance, the second state of the terminal in the first S-CSCF is inconsistent with the first state of the terminal in the eMSC (e.g., the first state is the registration state while the second state is the deregistration state). In this case, the terminal needs to re-send a registration request to the IMS through the eMSC, so that the terminal can be re-registered in the IMS.

In Operation S802, the terminal is registered in the IMS according to the identification of the terminal.

An HSS is searched for according to the identification of the terminal, and the second S-CSCF is selected in the IMS for the terminal. The terminal is registered to the second S-CSCF. After the registration is completed, the second S-CSCF may return a registration success response message to the eMSC. The registration success response message includes the address of the second S-CSCF.

When the eMSC receives the registration success response message returned by the second S-CSCF, it can determine that the second state of the terminal has been updated to the registration state, thereby ensuring that the first state and the second state of the terminal are both the registration state, that is, ensuring that the first state and the second state of the terminal are consistent. Meanwhile, the address of the second S-CSCF is obtained by parsing the registration success response message, enabling the eMSC to send the cached call request of the terminal according to this address to the second S-CSCF to which the terminal is newly registered.

In Operation S803, in response to the call request of the terminal forwarded by the eMSC, service data for the terminal is provided to complete the initial call service.

When the second S-CSCF receives the call request of the terminal forwarded by the eMSC, it may provide the terminal with corresponding service data according to the relevant service requirement information carried in the call request to complete the current call service and ensure that the call service process is performed normally.

In the present disclosure, the registration request sent by the eMSC is received, the identification of the terminal is obtained, and the terminal is registered in the IMS according to the identification of the terminal to ensure that the first state and the second state of the terminal are consistent. After the call request of the terminal forwarded by the eMSC is received, the service data for the terminal is provided to ensure that the call service of the terminal can be successfully completed, so that the devices in the eMSC and IMS do not need to consume memory resources to save the registration state information and the relevant signaling information, reducing the CPU consumption of the devices in eMSC and IMS, reducing the network signaling traffic, and improving the performance of the network elements.

The present disclosure provides a method for implementing a call service. The implementation details of the method for implementing a call service according to the present disclosure will be specifically described below. The following content is only for the convenience of understanding the implementation details of the solution, and is not necessary for implementing the solution.

Figure 9:
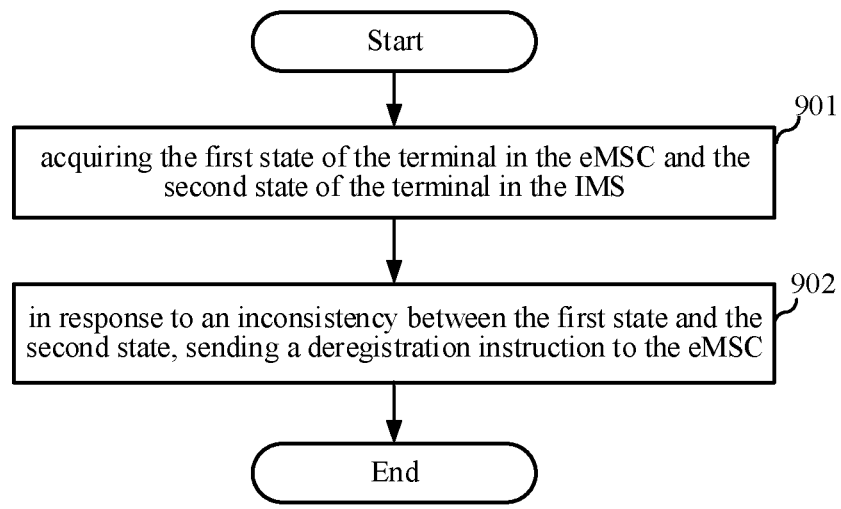
FIG. 9 is a flowchart of a method for implementing a call service according to the present disclosure.

FIG. 9 is a flowchart of a method for implementing a call service according to the present disclosure. The method is applicable to an apparatus for implementing a call service, or operable on an HLR. As shown in FIG. 9, the method includes the following Operations S901 to S902.

In Operation S901, the first state of the terminal in the eMSC and the second state of the terminal in the IMS are acquired.

The eMSC does not subscribe to the registration state information in the IMS. When sending the call request message to the eMSC, the terminal may carry the identification of the terminal in the call request message, and the first state and the second state of the terminal may be specifically determined according to the identification of the terminal.

In some specific implementations, the first state stored in the eMSC is acquired according to the identification of the terminal; if the HLR and the HSS in the IMS are integrated in a same device, the notification message sent by the HSS can be received through an internal interface to acquire the second state; otherwise, the notification message sent by the HSS can be received through an external interface to acquire the second state.

For example, if the HLR and the HSS are integrated and implemented on the same device, the HLR receives the notification message sent by the HSS through an internal interface (e.g., a custom interface between modules). The notification message includes the second state of the terminal in the IMS so that the HLR can know the second state of the terminal by parsing the notification message. If the HLR and the HSS are implemented as two separate devices, the HLR receives the notification message sent by the HSS through an external interface (e.g., an interface connected by a network cable between devices, or a wireless interface, etc.), so that the HLR can know the second state of the terminal by parsing the notification message.

In Operation S902, in response to an inconsistency between the first state and the second state, a deregistration instruction is sent to the eMSC.

After receiving the deregistration instruction, the eMSC may deregister the terminal from the CS domain, and update the first state of the terminal (i.e., the state of the terminal in the CS domain) to synchronize the first state with the second state, that is, the first state of the terminal is updated to the deregistration state. When the eMSC receives the call request sent by the terminal, it may re-register the terminal in the IMS and complete the call service of the terminal.

In some specific implementations, if it is determined that the first state is the registration state and the second state is the deregistration state, a deregistration instruction is generated according to the second state, and is sent to the eMSC to deregister the terminal and to update the first state to the deregistration state.

Due to reasons such as a service requirement or a device failure, a device in the IMS may deregister a certain terminal and update the second state of the terminal in the IMS to the deregistration state. However, since the corresponding registration state information is not subscribed to, the first state of the terminal on the eMSC is not updated and is still the registration state. At this time, the HLR may actively generate a deregistration instruction and send it to the eMSC, so that the eMSC can synchronously deregister the terminal and update the first state of the terminal to the deregistration state. It is ensured that the first state and the second state of the terminal can be kept consistent, which facilitates the subsequent access of the terminal, reduces the signaling interaction, and improves the service processing efficiency.

In the present disclosure, the first state of the terminal in the eMSC and the second state of the terminal in the IMS are acquired, and if it is determined that the first state and the second state are inconsistent, a deregistration instruction is sent to the eMSC so that the eMSC deregisters the terminal from the CS domain and updates the first state of the terminal to the deregistration state. It is ensured that the first state and the second state of the terminal can be quickly synchronized without subscribing to the registration state information, so that the devices in the eMSC and IMS do not need to consume memory resources to save the registration state information and the relevant signaling information, reducing the CPU consumption of the devices in the eMSC and IMS; meanwhile, it is ready for the terminal to perform a subsequent call service as needed, improving the service processing efficiency and improving the user experience.

Figure 10:
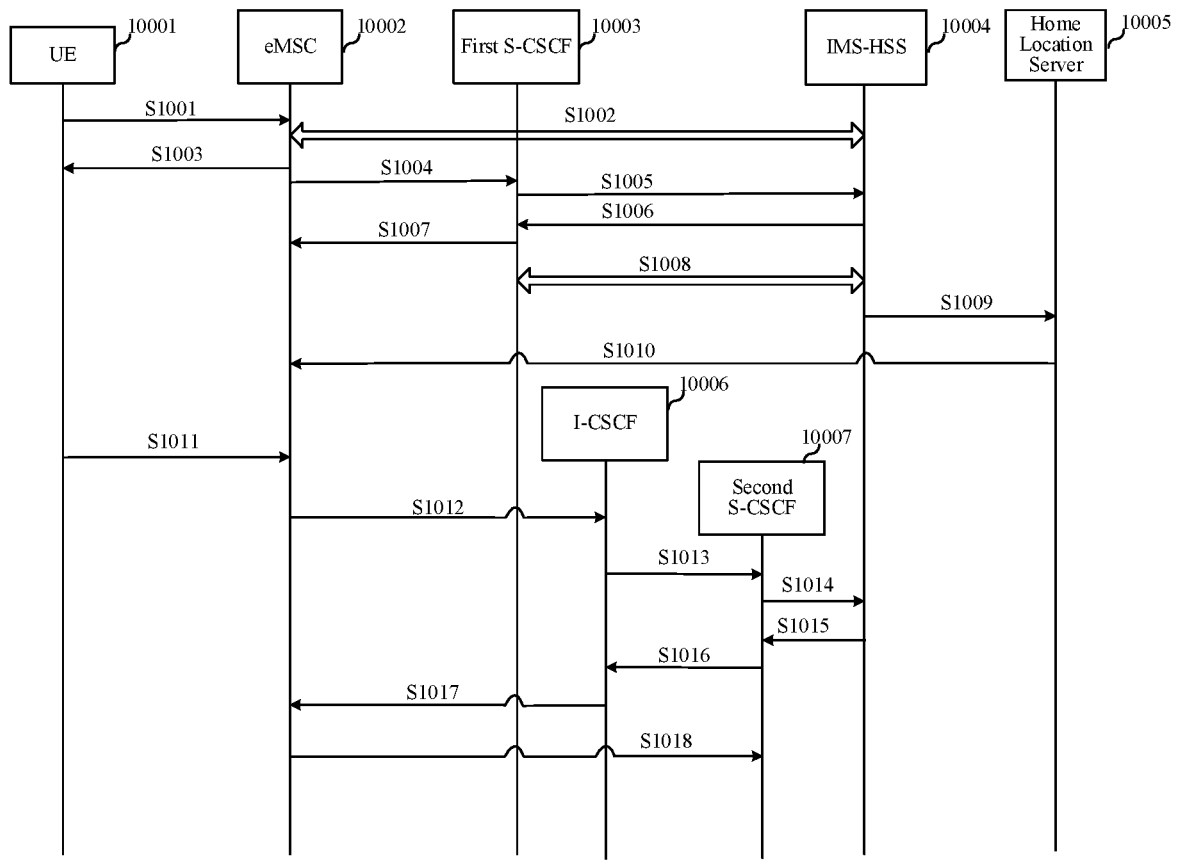
FIG. 10 is a flowchart of a working method of a user terminal when performing a call service according to the present disclosure.

FIG. 10 is a flowchart of a working method of a user terminal when performing a call service according to the present disclosure. As shown in FIG. 10, the method may include the following Operations S1001 to S1018.

In Operation S1001, the UE 10001 sends a local update request to the eMSC 10002.

In Operation S1002, the eMSC 10002 completes the update of the local information through signaling interaction with a device (e.g., the IMS-HSS 10004) in the IMS (e.g., makes the IMS-HSS 10004 to update the address of the eMSC 10002 saved thereon, etc.).

In Operation S1003, the eMSC 10002 feeds back a local update success response to the UE 10001.

In Operation S1004, the eMSC 10002 sends a registration request to the first S-CSCF 10003, and the registration request is used to cause the UE 10001 to be registered to the first S-CSCF 10003 in the IMS.

In Operation S1005, after receiving the registration request sent by the eMSC 10002, the first S-CSCF 10003 sends a subscription data request (e.g., sends a message Diameter_SAR based on the Diameter protocol) to the IMS-HSS 10004.

In Operation S1006, after the IMS-HSS 10004 confirms that the subscription of the UE 10001 is successful, it feeds back a subscription data success response (e.g., feeds back a message Diameter_SAA based on the Diameter protocol) to the first S-CSCF 10003.

In Operation S1007, the first S-CSCF 10003 returns a registration success response message to the eMSC 10002, to cause the eMSC 10002 to confirm that the UE 10001 has been successfully registered to the first S-CSCF 10003 in the IMS.

It should be noted that, since the eMSC 10002 does not initiate a registration state subscription, it is possible that the first state of the UE 10001 on the eMSC 10002 (i.e., the state of the UE 10001 in the CS domain) and the second state of the UE 10001 on the device in the IMS (i.e., the state of the UE 10001 in the IMS domain) are inconsistent.

In Operation S1008, in a case that the first S-CSCF 10003 in the IMS actively deregisters the user (for example, the first S-CSCF 10003 is restarted or is in a disaster tolerance scenario due to reasons such as a device failure), or that the IMS-HSS 10004 actively deregisters the UE 10001, all the devices in the IMS can know that the second state of the UE 10001 is the deregistration state through signaling interaction between the first S-CSCF 10003 and the IMS-HSS 10004; however, since the eMSC 10002 does not initiate the registration state subscription, the first S-CSCF 10003 cannot send a notification message (NOTIFY) to the eMSC 10002, so that the first state of the UE 10001 on the eMSC 10002 is still the registration state.

In Operation S1009, the IMS-HSS 10004 sends a deregistration message (e.g., a MAP_CANCEL_LOCATION message) to the Home Location Server 10005, and the deregistration message includes the identification of the UE 10001.

In Operation S1010, the Home Location Server 10005 forwards the MAP_CANCEL_LOCATION message to the eMSC 10002 to inform that the UE 10001 has been deregistered from the IMS domain, and that the eMSC 10002 needs to synchronously change the first state of the UE 10001 to the deregistration state, so that the eMSC 10002 deregisters the UE 10001 and changes the first state of the UE 10001 on the eMSC 10002 to the deregistration state, and thereby ensuring that the first state is consistent with the second state of the UE 10001 on the IMS domain and facilitating the subsequent access of the UE 10001.

It should be noted that, if the IMS-HSS 10004 and the Home Location Server 10005 are integrated into a same device, the deregistration message sent in Operation S1009 may be transmitted through an internal message interface; if the IMS-HSS 10004 and the Home Location Server 10005 are two separate devices, the deregistration message sent in Operation S1009 may be transmitted through an external message interface of the device.

In Operation S1011, in the CS domain, the UE 10001 sends a call request to the eMSC 10002.

In Operation S1012, the eMSC 10002 knows that the UE 10001 is currently in the deregistration state by query, and initiates a new registration process, that is, sends a new registration request to the I-CSCF 10006.

In Operation S1013, the I-CSCF 10006 allocates the UE 10001 to the second S-CSCF 10007 by interrogating, and then forwards the new registration request to the second S-CSCF 10007.

In Operation S1014, after receiving the new registration request sent by the I-CSCF 10006, the second S-CSCF 10007 sends a re-subscription data request (e.g., sends a message Diameter_SAR based on the Diameter protocol) to the IMS-HSS 10004.

In Operation S1015, after confirming that UE 10001 is successfully re-subscribed, the IMS-HSS 10004 feeds back a re-subscription data success response (e.g., feeds back a message Diameter_SAA based on the Diameter protocol) to the second S-CSCF 10007.

In Operation S1016, the second S-CSCF 10007 returns a new registration success response message to the I-CSCF 10006.

The registration success response message includes the address of the second S-CSCF 10007.

In Operation S1017, the I-CSCF 10006 confirms that the UE 10001 has been successfully registered to the second S-CSCF 10007 in the IMS, and feeds back a successful registration response to the eMSC 10002.

It should be noted that, after it is confirmed that the UE 10001 is registered to the second S-CSCF 10007 in the IMS, the first state of the UE 10001 in the eMSC 10002 and the second state of the UE 10001 in the IMS are both the registration state, ensuring that the state of the UE 10001 in the CS domain and the state of the UE 10001 in the IMS domain are consistent.

In Operation S1018, according to the address of the second S-CSCF 10007 in the registration success response message, the eMSC 10002 sends the cached call request of the UE 10001 to the second S-CSCF 10007 to which the UE 10001 is newly registered, so as to complete the current call and ensure that the call service process is performed normally.

In the present disclosure, in a case that the first state of the UE in the CS domain is inconsistent with the second state of the UE in the IMS, and the UE does not subscribe to the registration state information, the Home Location Server knows that the second state in the IMS is the deregistration state through interacting with the IMS-HSS, and informs the eMSC of the deregistration state, so that the eMSC can synchronously deregisters the UE, so as to ensure synchronization of the first state and the second state of the UE. Each of devices does not need to process messages such as the subscription request and the notification request, nor does it need to maintain the process related to the subscription session, which reduces the memory occupation in the devices in the eMSC and IMS by the registration state information, reduces the CPU consumption of the devices, reduces the network signaling traffic, and improves the performance of the network elements.

The operations of the above various methods are merely for the clarity of description. During implementation, they can be combined into one operation or some operations can be split and decomposed into multiple operations. As long as they have the same logical relationship, they are all within the protection scope of this patent. Adding insignificant modifications to the algorithm or process or introducing insignificant designs without changing the core design of the algorithm and process are also within the protection scope of this patent.

The present disclosure provides an apparatus for implementing a call service. For the specific implementation of the apparatus, reference may be made to the relevant description of the embodiment described in conjunction with FIG. 5, and the similarities will not be repeated. It should be noted that the specific implementation of the apparatus in this embodiment can also refer to the relevant description of the embodiment described in conjunction with FIG. 6, but is not limited to the above two embodiments, and other unexplained embodiments are also within the protection scope of this apparatus.

Figure 11:
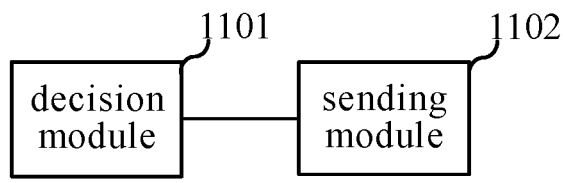
FIG. 11 is a block diagram of a composition of an apparatus for implementing a call service according to the present disclosure.

FIG. 11 is a block diagram of a composition of an apparatus for implementing a call service according to the present disclosure. As shown in FIG. 11, the apparatus may include a decision module 1101 and a sending module 1102. The decision module 1101 is configured to decide whether a first state of a terminal in the eMSC is consistent with a second state of the terminal in the IMS. The sending module 1102 is configured to send a registration request to the IMS if deciding that the first state and the second state are inconsistent, so as to cause the terminal to complete an initial call service, wherein the eMSC does not subscribe to registration state information in the IMS.

In the present disclosure, the decision module decides whether the first state of the terminal in the eMSC is consistent with the second state of the terminal in the IMS, and if not, the sending module sends the registration request to the IMS, enabling the terminal to communicate with the devices in the IMS, and thus complete the initial call service and obtain the relevant service information in the IMS, so that the devices in the eMSC and IMS do not need to consume memory resources to save the registration state information and relevant signaling information, reducing the CPU consumption of the devices in the eMSC and IMS, reducing the network signaling traffic, and improving the performance of the network elements.

The apparatus provided in this embodiment corresponds to the embodiment described with reference to FIG. 5 or FIG. 6, and this embodiment may be implemented in cooperation with the embodiment described with reference to FIG. 5 or FIG. 6. The relevant technical details mentioned in the embodiment described with reference to FIG. 5 or FIG. 6 are also applicable to this embodiment, and will not be described here in order to reduce repetition. Correspondingly, the relevant technical details mentioned in this embodiment are also applicable to the embodiment described with reference to FIG. 5 or FIG. 6.

The present disclosure provides a CSCF. For the specific implementation of this entity, reference may be made to the relevant description of the embodiment described in conjunction with FIG. 8, and the similarities will not be repeated. The specific implementation of the CSCF in this embodiment is not limited to the above embodiment, and other unexplained embodiments are also within the protection scope of this entity.

Figure 12:
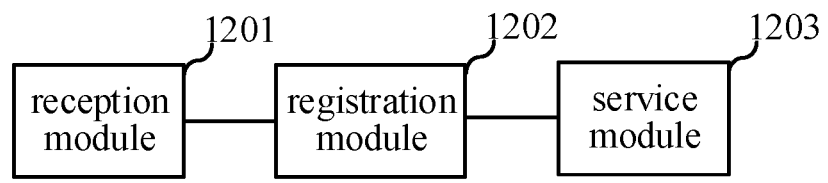
FIG. 12 is a block diagram of a composition of a CSCF according to the present disclosure.

FIG. 12 is a block diagram of a composition of a CSCF according to the present disclosure. As shown in FIG. 12, this CSCF may include a reception module 1201, a registration module 1202 and a service module 1203. The reception module 1201 is configured to receive a registration request sent by the eMSC, wherein the registration request is a request sent when the eMSC decides that a first state of a terminal in it is inconsistent with a second state of the terminal in the IMS, and the eMSC does not subscribe to registration state information in the IMS, and the registration request includes an identification of the terminal. The registration module 1202 is configured to register the terminal in the IMS according to the identification of the terminal. The service module 1203 is configured to, in response to a call request of the terminal forwarded by the eMSC, provide service data for the terminal to complete the initial call service.

In the present disclosure, the reception module receives the registration request sent by the eMSC and obtains the identification of the terminal, and the registration module registers the terminal in the IMS according to the identification of the terminal to ensure that the first state and the second state of the terminal are consistent. After the call request of the terminal forwarded by the eMSC is received, the service module provides the service data for the terminal to ensure that the call service of the terminal can be successfully completed, so that the devices in the eMSC and IMS do not need to consume memory resources to save the registration state information and relevant signaling information, reducing the CPU consumption of the devices in the eMSC and IMS, reducing the network signaling traffic, and improving the performance of the network elements.

The entity provided in this embodiment corresponds to the embodiment described with reference to FIG. 8, and this embodiment may be implemented in cooperation with the embodiment described with reference to FIG. 8. The relevant technical details mentioned in the embodiment described with reference to FIG. 8 are also applicable to this embodiment, and will not be described here in order to reduce repetition. Correspondingly, the relevant technical details mentioned in this embodiment are also applicable to the embodiment described with reference to FIG. 8.

The present disclosure provides an apparatus for implementing a call service. For the specific implementation of the apparatus, reference may be made to the relevant description of the embodiment described in conjunction with FIG. 9, and the similarities will not be repeated. The specific implementation of the apparatus in this embodiment is not limited to the above embodiment, and other unexplained embodiments are also within the protection scope of this apparatus.

Figure 13:
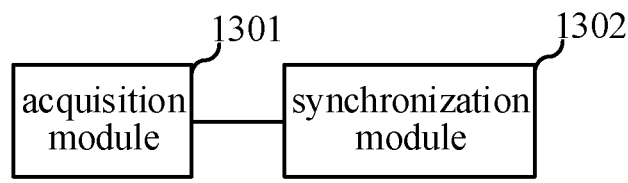
FIG. 13 is a block diagram of a composition of an apparatus for implementing a call service according to the present disclosure.

FIG. 13 is a block diagram of a composition of an apparatus for implementing a call service according to the present disclosure. As shown in FIG. 13, the apparatus may include an acquisition module 1301 and a synchronization module 1302. The acquisition module 1301 is configured to acquire the first state of the terminal in the eMSC and the second state of the terminal in the IMS, wherein the eMSC does not subscribe to the registration state information in the IMS. The synchronization module 1302 is configured to send a deregistration instruction to the eMSC when determining that the first state is inconsistent with the second state, to cause the eMSC to synchronize the first state with the second state, thereby causing the terminal to complete the call service when a call request sent by the terminal is received.

In the present disclosure, the acquisition module acquires the first state of the terminal in the eMSC and the second state of the terminal in the IMS. Since the eMSC does not subscribe to the registration state information in the IMS, a device in the IMS cannot synchronize the state of the terminal in the eMSC with the second state of the terminal in the IMS, so that the first state of the terminal in the eMSC and the second state of the terminal in the IMS may be inconsistent. In a case that the first state is inconsistent with the second state, the apparatus for implementing a call service sends a deregistration instruction to the eMSC to cause the eMSC to synchronize the first state with the second state, causing the terminal to complete the call service when a call request sent by the terminal is received, thereby ensuring a smooth call service of the terminal and improving the user experience.

The apparatus provided in this embodiment corresponds to the embodiment described with reference to FIG. 9, and this embodiment may be implemented in cooperation with the embodiment described with reference to FIG. 9. The relevant technical details mentioned in the embodiment described with reference to FIG. 9 are also applicable to this embodiment, and will not be described here in order to reduce repetition. Correspondingly, the relevant technical details mentioned in this embodiment are also applicable to the embodiment described with reference to FIG. 9.

It should be understood that the present disclosure is not limited to the specific configurations and processes described in the above embodiments and shown in the figures. For the convenience and brevity of the description, the detailed description of the known methods is omitted here, and the specific working processes of the systems, modules and units described above may refer to the corresponding processes in the foregoing method embodiments, which will not be repeated here.

Figure 14:
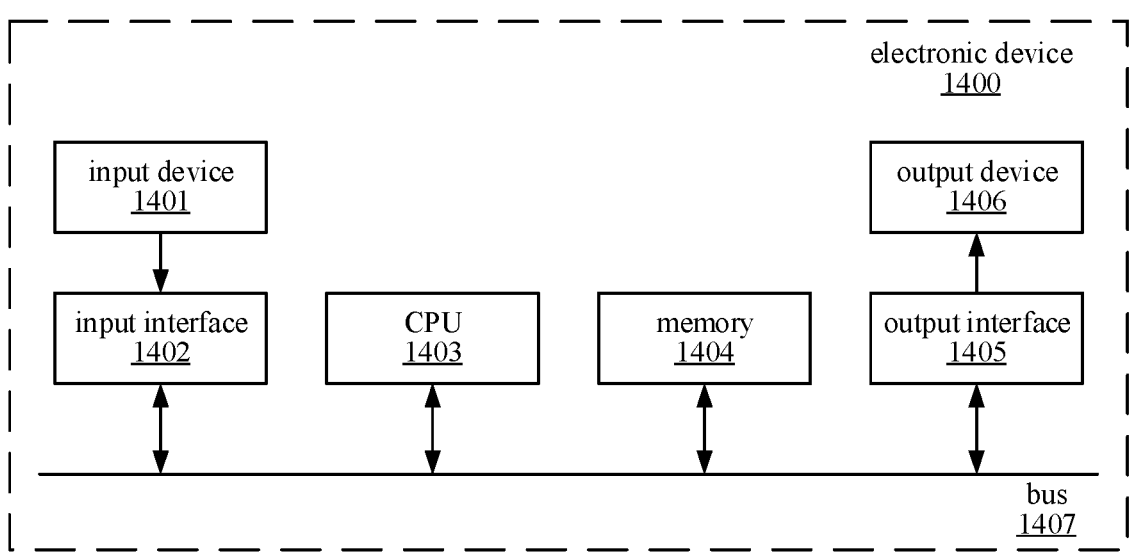
FIG. 14 is a structural diagram of an exemplary hardware architecture of an electronic device that can implement a method and an apparatus for implementing a call service according to the present disclosure.

FIG. 14 is a structural diagram of an exemplary hardware architecture of an electronic device that can implement a method and an apparatus for implementing a call service according to the present disclosure.

As shown in FIG. 14, the electronic device includes an input device 1401, an input interface 1402, a central processing unit (CPU) 1403, a memory 1404, an output interface 1405 and an output device 1406. The input interface 1402, the CPU 1403, the memory 1404 and the output interface 1405 are connected to each other through a bus 1407, and the input device 1401 and the output device 1406 are connected to the bus 1407 through the input interface 1402 and the output interface 1405, respectively, and thus connected to other components of the electronic device 1400.

The input device 1401 receives input information from the outside, and transmits the input information to the CPU 1403 through the input interface 1402. The CPU 1403 processes the input information based on the computer executable instructions stored in the memory 1404 to generate output information, stores the output information in the memory 1404 temporarily or permanently, and then transmits the output information to the output device 1406 through the output interface 1405. The output device 1406 outputs the output information to the outside of the electronic device 1400 for the user to use.

In an embodiment, the electronic device 1400 shown in FIG. 14 may be implemented as a system for implementing a call service, which may include: a memory configured to store a program; a processor configured to run the program stored in the memory to execute the method described in any of the above embodiments of the present disclosure.

According to the present disclosure, the processes described above with reference to the flowcharts may be implemented as computer software programs. For example, the present disclosure provides a computer program product, including a computer program tangibly embodied on a computer readable storage medium, the computer program containing program codes for performing the methods illustrated in the flowcharts. In such an embodiment, the computer program may be downloaded and installed from a network, and/or installed from a removable storage medium.

It should be understood for those of ordinary skill that all or some of the steps in the methods disclosed above, functional modules/units in the systems and devices can be implemented as software, firmware, hardware, and appropriate combinations thereof. In a hardware implementation, the division between the functional modules/units mentioned in the above description does not necessarily correspond to the division of physical components; for example, one physical component may have multiple functions, or one function or step may be performed by several physical components cooperatively. Some or all physical components may be implemented as software executed by a processor, such as a central processing unit, digital signal processor or microprocessor, or as hardware, or as an integrated circuit, such as an application specific integrated circuit. Such software may be distributed on computer readable storage media, which may include computer storage media (or non-transitory media) and communication media (or transitory media). As is known to those of ordinary skill in the art, the term computer storage media includes both volatile and nonvolatile, removable and non-removable media implemented in any method or technology for storage of information (such as computer readable instructions, data structures, program modules or other data). The computer storage media include, but are not limited to, RAM, ROM, EEPROM, flash memory or other memory technology, CD-ROM, digital versatile disk (DVD) or other optical disk storage, magnetic cartridge, magnetic tape, magnetic disk storage or other magnetic storage devices, or may any other media which are used to store desired information and can be accessed by a computer. In addition, the communication media typically includes computer readable instructions, data structures, program modules, or other data in a modulated data signal such as a carrier wave or other transport mechanism, and can include any information delivery media, as is well known to those of ordinary skill in the art.

It should be understood that the above embodiments are merely exemplary embodiments adopted to illustrate the principles of the present disclosure, and the present disclosure is not limited thereto. For those skilled in the art, various modifications and improvements can be made without departing from the spirit and essence of the present disclosure, and these modifications and improvements are also regarded as the protection scope of the present disclosure.

What is claimed is:

1. A method for implementing a call service, comprising:
    deciding whether a first state of a terminal in a Mobile Switch Center enhanced for ICS (eMSC) is consistent with a second state of the terminal in an Internet Protocol Multimedia Subsystem (IMS); and
    in response to an inconsistency between the first state and the second state, sending a registration request to the IMS to cause the terminal to complete an initial call service,
    wherein the eMSC does not subscribe to registration state information in the IMS.

2. The method of claim 1, wherein in response to the inconsistency between the first state and the second state, sending the registration request to the IMS to cause the terminal to complete the initial call service comprises:
    in response to the first state being a registration state and the second state being a deregistration state, sending the registration request to the IMS to cause the terminal to complete the initial call service.

3. The method of claim 1, wherein after the terminal completing the initial call service, the method further comprises:
    deregistering the terminal in response to a deregistration message sent by a Home Location Register (HLR) in the IMS; and
    changing the first state to a deregistration state.

4. The method of claim 1, wherein before deciding whether the first state of the terminal in the eMSC is consistent with the second state of the terminal in the IMS, the method further comprises:
    receiving an initial call request sent by the terminal, and acquiring the first state of the terminal in the eMSC; and
    acquiring the second state of the terminal in the IMS.

5. The method of claim 4, wherein acquiring the second state of the terminal in the IMS comprises:
    forwarding the initial call request to a first Serving Call Session Control Function entity (S-CSCF) in the IMS; and
    in response to a call rejection response fed back by the first S-CSCF, acquiring the second state of the terminal that is a deregistration state.

6. The method of claim 5, wherein after receiving the initial call request sent by the terminal and before forwarding the initial call request to the first S-CSCF in the IMS, the method further comprises:
    caching the initial call request to the eMSC.

7. The method of claim 2, wherein sending the registration request to the IMS to cause the terminal to complete the initial call service comprises:
    sending the registration request to an Interrogating Call Session Control Function entity (I-CSCF) in the IMS to cause the I-CSCF to interrogate a Home Subscriber Server (HSS), and select a second S-CSCF for the terminal so as to perform registration in the second S-CSCF, wherein the registration request comprises an identification of the terminal; and in response to a registration success response fed back by the I-CSCF, sending an initial call request of the terminal to the second S-CSCF to cause the terminal to complete the initial call service, wherein the registration success response comprising an address of the second S-CSCF.

8. A method for implementing a call service, comprising:
receiving a registration request sent by a Mobile Switch Center enhanced for ICS (eMSC), wherein the registration request is a request sent when the eMSC decides that a first state of a terminal in it is inconsistent with a second state of the terminal in an Internet Protocol Multimedia Subsystem (IMS), and the eMSC does not subscribe to registration state information in the IMS, and the registration request comprises an identification of the terminal;
registering the terminal in the IMS according to the identification of the terminal; and
in response to a call request of the terminal forwarded by the eMSC, providing service data for the terminal to complete an initial call service.

9. An apparatus for implementing a call service, comprising:
a decision module configured to decide whether a first state of a terminal in a Mobile Switch Center enhanced for ICS (eMSC) is consistent with a second state of the terminal in an Internet Protocol Multimedia Subsystem (IMS); and
a sending module configured to, in response to deciding that the first state and the second state are inconsistent, send a registration request to the IMS to cause the terminal to complete an initial call service,
wherein the eMSC does not subscribe to registration state information in the IMS.

10. An electronic device, comprising:
one or more processors; and
a storage device storing one or more programs thereon, wherein the one or more programs, when executed by the one or more processors, cause the one or more processors to implement the method for implementing a call service of claim 1.

11. An electronic device, comprising:
one or more processors; and
a storage device storing one or more programs thereon, wherein the one or more programs, when executed by the one or more processors, cause the one or more processors to implement the method for implementing a call service of claim 8.

12. A non-transitory computer readable storage medium storing a computer program thereon, wherein the computer program, when executed by a processor, cause the processor to implement the method for implementing a call service of claim 1.

13. A non-transitory computer readable storage medium storing a computer program thereon, wherein the computer program, when executed by a processor, cause the processor to implement the method for implementing a call service of claim 8.

* * * * *